United States Patent
Hogg

(10) Patent No.: US 8,390,948 B2
(45) Date of Patent: Mar. 5, 2013

(54) DISK DRIVE EMPLOYING A PREAMP COMPRISING READ/WRITE PASS THROUGHS FOR CASCADING INTEGRATED CIRCUITS

(75) Inventor: Dennis W. Hogg, Laguna Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 479 days.

(21) Appl. No.: 12/788,152

(22) Filed: May 26, 2010

(65) Prior Publication Data

US 2011/0292534 A1 Dec. 1, 2011

(51) Int. Cl.
*G11B 5/09* (2006.01)
*G11B 5/02* (2006.01)
(52) U.S. Cl. ............................................ 360/46; 360/67
(58) Field of Classification Search .................. None
See application file for complete search history.

(56) References Cited

U.S. PATENT DOCUMENTS

| | | | |
|---|---|---|---|
| 6,111,717 A | 8/2000 | Cloke et al. | |
| 6,584,516 B1 | 6/2003 | Hill | |
| 6,924,953 B2 | 8/2005 | Fish et al. | |
| 7,139,143 B2 | 11/2006 | Tsunoda et al. | |
| 2002/0097522 A1 | 7/2002 | Teterud et al. | |
| 2012/0014011 A1* | 1/2012 | Wilson | 360/39 |

* cited by examiner

*Primary Examiner* — Regina N Holder

(57) ABSTRACT

A disk drive is disclosed comprising a plurality of disk surfaces and a plurality of corresponding heads. The disk drive further comprises a preamp including a first integrated circuit coupled to a first plurality of the heads. The first integrated circuit comprises a first read-output for outputting a preamplified read signal, a first write-input for receiving a first write signal, a write-output-passthrough for outputting a passthrough write signal in response to the first write signal, and a read-input-passthrough for receiving a passthrough read signal. The preamp further comprises a second integrated circuit coupled to a second plurality of the heads, wherein the second integrated circuit comprises a second read-output for outputting the passthrough read signal, and a second write-input for receiving the passthrough write signal.

25 Claims, 5 Drawing Sheets

US 8,390,948 B2

DISK DRIVE EMPLOYING A PREAMP COMPRISING READ/WRITE PASS THROUGHS FOR CASCADING INTEGRATED CIRCUITS

BACKGROUND

Disk drives typically comprise a number of disks with a head actuated over each of the top and bottom disk surface. Each head is connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

A disk drive also typically comprises a preamp circuit for amplifying the read signal emanating from one of the heads during read operations, and for applying a write current to one of the heads during write operations. The preamp circuit is typically implemented as a separate integrated circuit mounted to the actuator arm assembly and connected through a flex circuit to a printed circuit board (PCB) mounted to a base of the disk drive. Additional control circuitry mounted on the PCB processes the preamplified read signal during read operations to demodulate the data recorded on the disk, as well as generates a data modulated write signal applied to the preamp circuit during write operations.

DETAILED DESCRIPTION OF EMBODIMENTS OF THE INVENTION

Figure 1A:
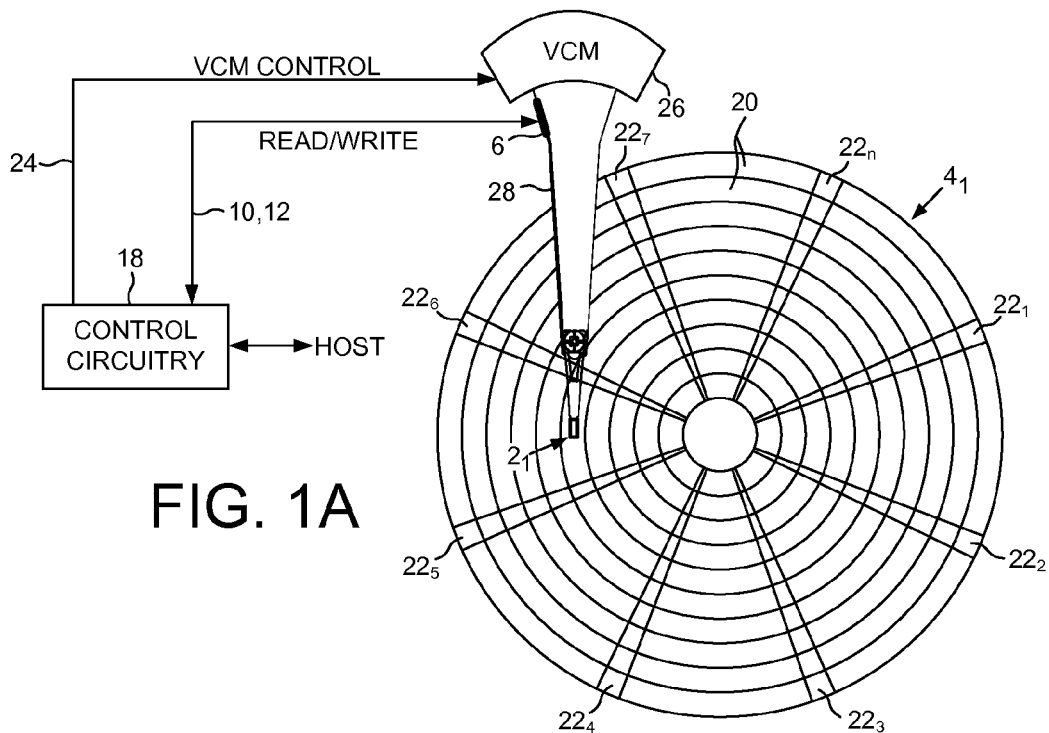
FIGS. 1A and 1B show a disk drive according to an embodiment of the present invention comprising a plurality of disk surfaces, a plurality of corresponding heads, and a preamp.
Figure 1B:
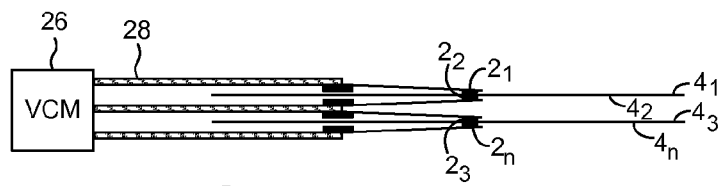

FIGS. 1A and 1B show a disk drive according to an embodiment of the present invention comprising a plurality of disk surfaces $4_1$-$4_n$ and a plurality of corresponding heads $2_1$-$2_n$. The disk drive further comprises a preamp 6 (FIG. 1C) including a first integrated circuit 8A coupled to a first plurality of the heads, wherein the first integrated circuit 8A comprises a first read-output (RD_OUT) for outputting a preamplified read signal 10, a first write-input (WR_IN) for receiving a first write signal 12, a write-output-passthrough (WR_OUT_PT) for outputting a passthrough write signal 14 in response to the first write signal 12, and a read-input-passthrough (RD_IN_PT) for receiving a passthrough read signal 16. The preamp 6 further comprises a second integrated circuit 8B coupled to a second plurality of the heads, wherein the second integrated circuit 8B comprises a second read-output (RD_OUT) for outputting the passthrough read signal 16, and a second write-input (WR_IN) for receiving the passthrough write signal 14.

Figure 1C:
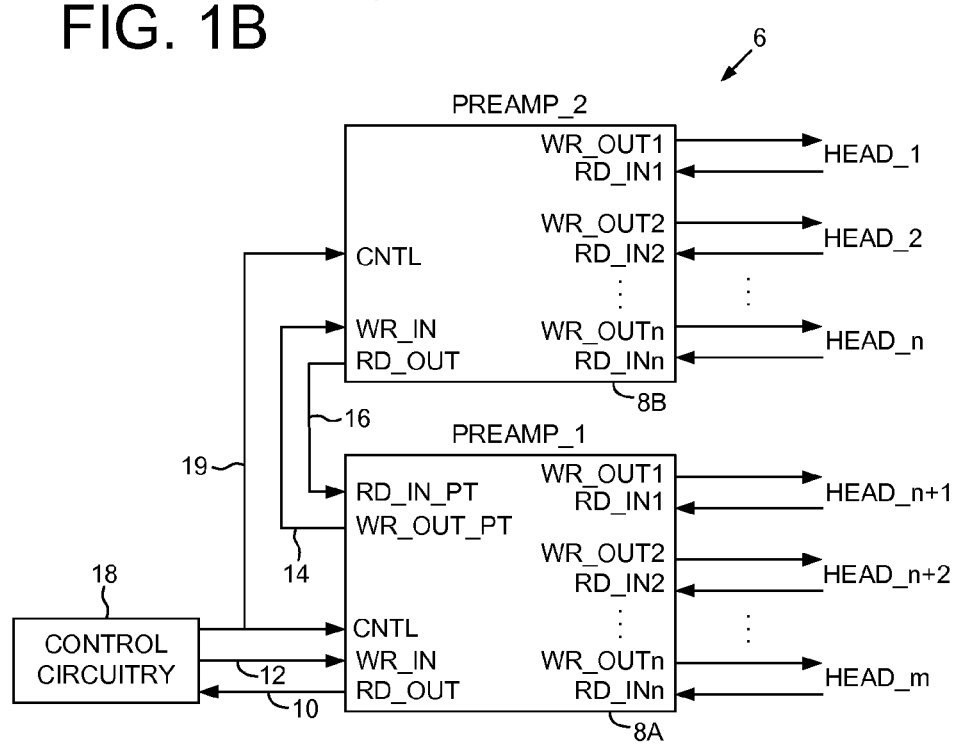
FIG. 1C shows a preamp according to an embodiment of the present invention comprising a first integrated circuit with write/read passthrough signals coupled to a second integrated circuit.

The disk drive of FIG. 1A further comprises control circuitry 18 operable to configure the preamp 6 to select one of the heads during a read operation, and configure the preamp 6 to select one of the heads during a write operation. The control circuitry 18 processes the preamplified read signal 10 at the read-output of the first integrated circuit 8A during read operations, and applies the first write signal 12 to the write-input of the first integrated circuit 8A during write operations. In the embodiment of FIG. 1C, the control circuitry 18 generates at least one control signal 19 applied to both the first and second integrated circuits 8A and 8B for selecting one of the heads, wherein the control signal 19 applied to both the first and second integrated circuits 8A and 8B is wire-ORed.

In the embodiment of FIG. 1A, each disk surface (e.g., disk surface $4_1$) comprises a plurality of tracks 20 defined by a plurality of embedded servo sectors $22_1$-$22_n$. As the head $2_1$ passes over a servo sector, the control circuitry 18 demodulates the preamplified read signal 10 into a position error signal (PES). The PES is filtered by a suitable compensation filter to generate a control signal 24 applied to a voice coil motor (VCM) 26. The VCM 26 rotates an actuator arm 28 about a pivot in order to position the head $2_1$ radially over the disk $4_1$ in a direction that reduces the PES.

In one embodiment, the read/write signals coupled to the first integrated circuit 8A (including the preamplified read signal 10, and first write signal 12), as well as the passthrough signals between the first and second integrated circuits 8A and 8B (including passthrough read signal 16 and passthrough write signal 14), comprise differential signals, wherein the differential signals may be carried by any suitable differential transmission lines.

Figure 2A:
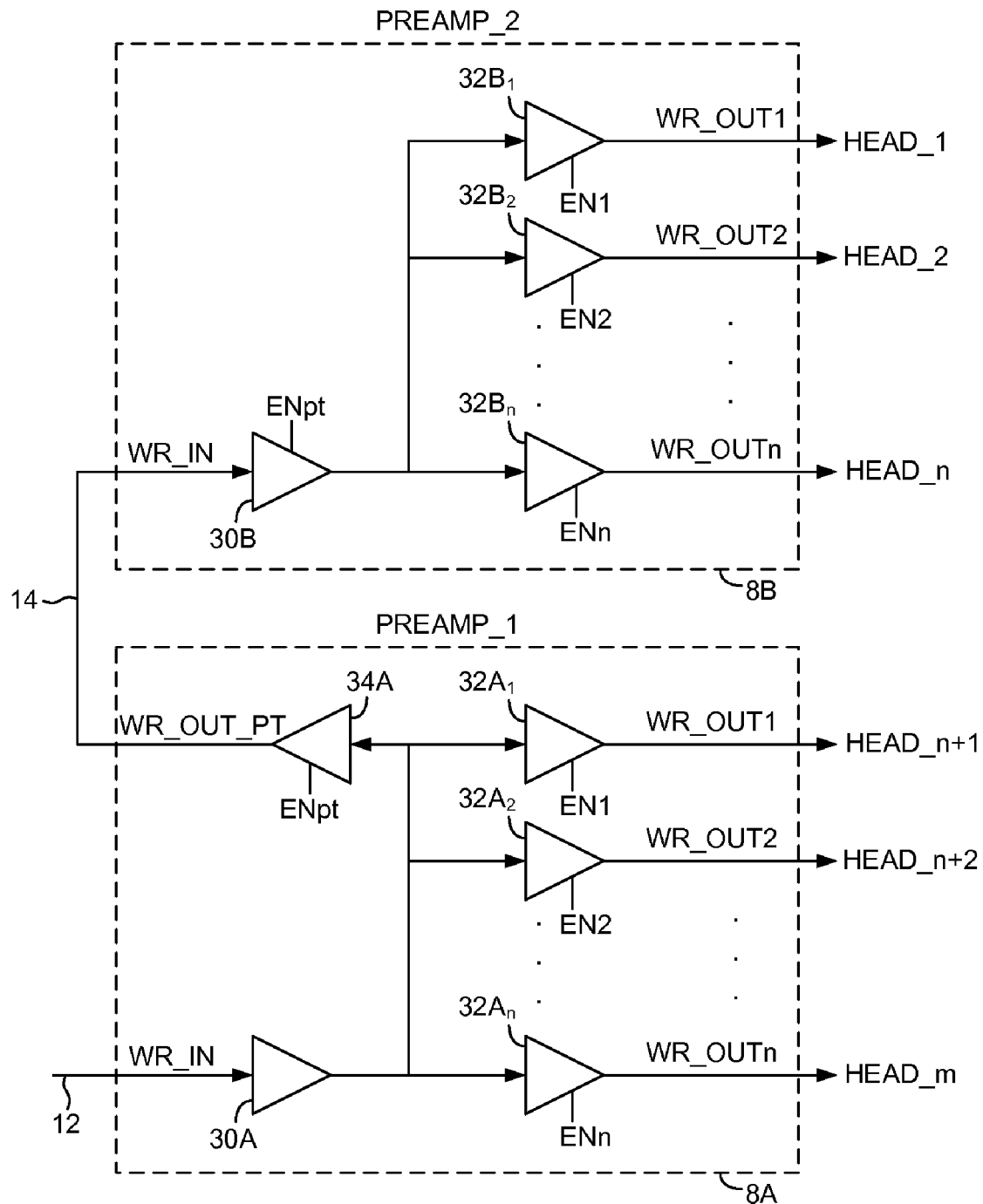
FIG. 2A shows details of the preamp for implementing write circuitry according to an embodiment of the present invention.

FIG. 2A shows details of the preamp 6 for implementing write circuitry according to an embodiment of the present invention. The first write signal 12 is applied to the write-input (WR_IN) of the first integrated circuit 8A, which is amplified by amplifier 30A. The output of amplifier 30A is applied to the input of amplifiers $32A_1$-$32A_n$ the outputs of which are applied to a respective head. The output of amplifier 30A is also applied to amplifier 34A which generates the passthrough write signal 14. When a write operation selects one of the heads coupled to the first integrated circuit 8A, the corresponding amplifier $32A_1$-$32A_n$ is enabled. When a write operation selects one of the heads coupled to the second integrated circuit 8B, the amplifier 34A is enabled in order to pass the first write signal 12 to the second integrated circuit 8B as the passthrough write signal 14. The passthrough write signal 14 is applied to the write-input (WR_IN) of the second integrated circuit 8B, which is amplified by amplifier 30B. The output of amplifier 30B is applied to the input of amplifiers $32B_1$-$32B_n$ the outputs of which are applied to a respective head. When a write operation selects one of the heads coupled to the second integrated circuit 8B, the amplifier 34A in the first integrated circuit 8A is enabled, amplifier 30B in the second integrated circuit 8B is enabled, and the corresponding head amplifier $32B_1$-$32B_n$ in the second integrated circuit 8B is enabled.

Figure 2B:
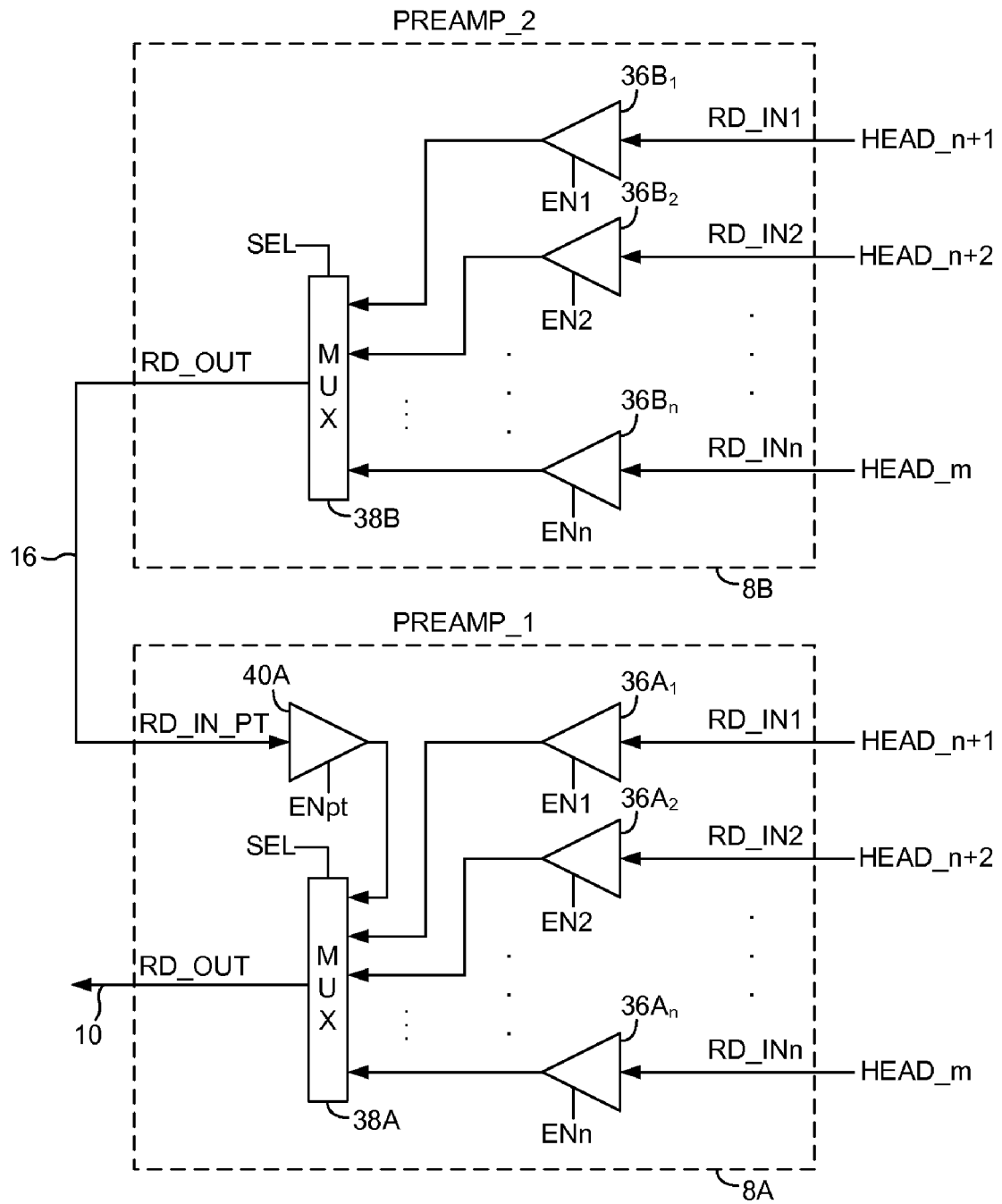
FIG. 2B shows details of the preamp for implementing read circuitry according to an embodiment of the present invention.

FIG. 2B shows details of the preamp for implementing read circuitry according to an embodiment of the present invention. The first integrated circuit 8A comprises a plurality of amplifiers $36A_1$-$36A_n$ each receiving a read signal generated by a respective head. When a read operation is performed using one of the heads coupled to the first integrated circuit 8A, a multiplexer 38A selects the output of the corresponding amplifier $36A_1$-$36A_n$ as the preamplified read signal 10 processed by the control circuitry 18. Any suitable circuitry may be used to implement the multiplexer 38A, wherein in one embodiment the multiplexer 38A comprises as an amplifier having an input coupled to the wired-OR outputs of amplifiers $36A_1$-$36A_n$ and the multiplexing operation is implemented by enabling the selected amplifier $36A_1$-$36A_n$. The first circuit 8A also comprises an amplifier 40A for generating the preamplified read signal 10 in response to the passthrough read signal 16. When a read operation is performed using one of the heads coupled to the second integrated circuit 8B, a multiplexer 38B selects the output of a corresponding (enabled) amplifier $36B_1$-$36B_n$ as the passthrough read signal 16. The amplifier 40A in the first integrated circuit 8A is enabled and selected 38A as the preamplified read signal 10 processed by the control circuitry 18.

In the embodiments of FIGS. 2A and 2B, the first integrated circuit 8A differs from the second integrated circuit 8B in that only the first integrated circuit 8A may comprise the passthrough amplifiers described above. In an alternative embodiment, the first integrated circuit 8A may be substantially the same as the second integrated circuit 8B in that both integrated circuits may comprise passthrough amplifiers, wherein one (or more) of the integrated circuits is configured as the passthrough integrated circuit. In this manner, the integrated circuits 8A and 8B can be fabricated using the same process and then cascaded and configured as desired.

Figure 3A:
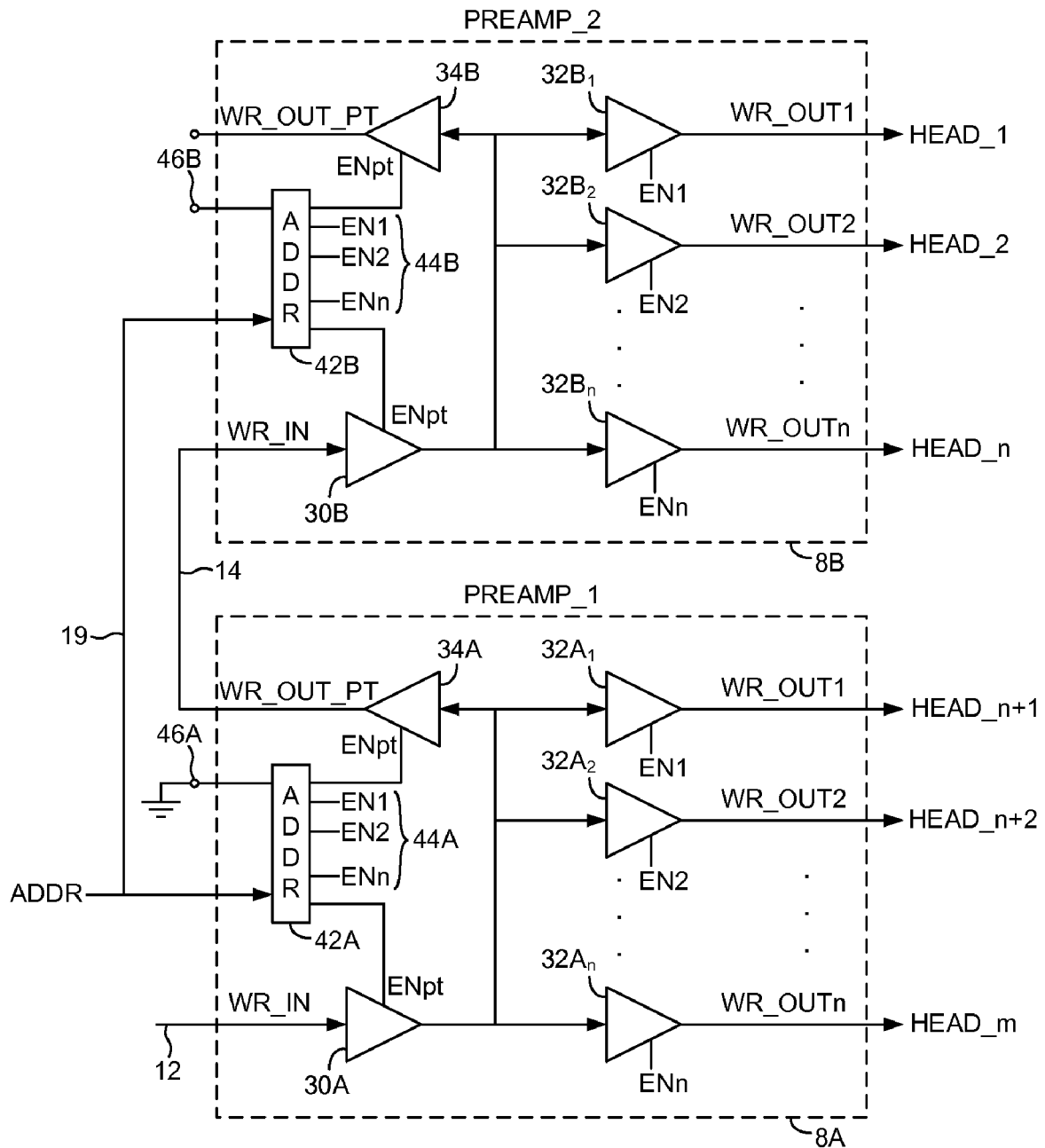
FIGS. 3A and 3B show a preamp circuit according to an embodiment of the present invention wherein the first and second integrated circuits are substantially the same, and each integrated circuit comprises address circuitry for decoding a head selection address.

FIG. 3A shows an embodiment of the preamp wherein the write circuitry is substantially the same for both the first and second integrated circuits 8A and 8B. Each integrated circuit comprises address circuitry 42A and 42B for generating enable signals 44A and 44B applied to the amplifiers $32A_1$-$32A_n$ and $32B_1$-$32B_n$, as well as enable signals applied to amplifiers 30A and 30B and amplifiers 34A and 34B. The address circuitry 42A and 42B configure the enable signals based on which head is selected for the write operation as described above. In one embodiment, the address circuitry 42A and 42B are configured based on the heads coupled to each integrated circuit. In the example of FIG. 3A, the second integrated circuit 8B is coupled to heads 1 to n, the first integrated circuit 8A is connected to heads n+1 to m, and the address circuitry 42A and 42B configured accordingly. In one embodiment, the address circuitry 42A and 42B are configured in response to an external pin 46A and 46B of each integrated circuit 8A and 8B. In the example of FIG. 3A, the address circuitry 42A of the first integrated circuit 8A is configured to address heads n+1 to m by grounding the external pin 46A, and the address circuitry 42B of the second integrated circuit 8B is configured to address heads 1 to n by leaving the external pin 46B open.

Figure 3B:
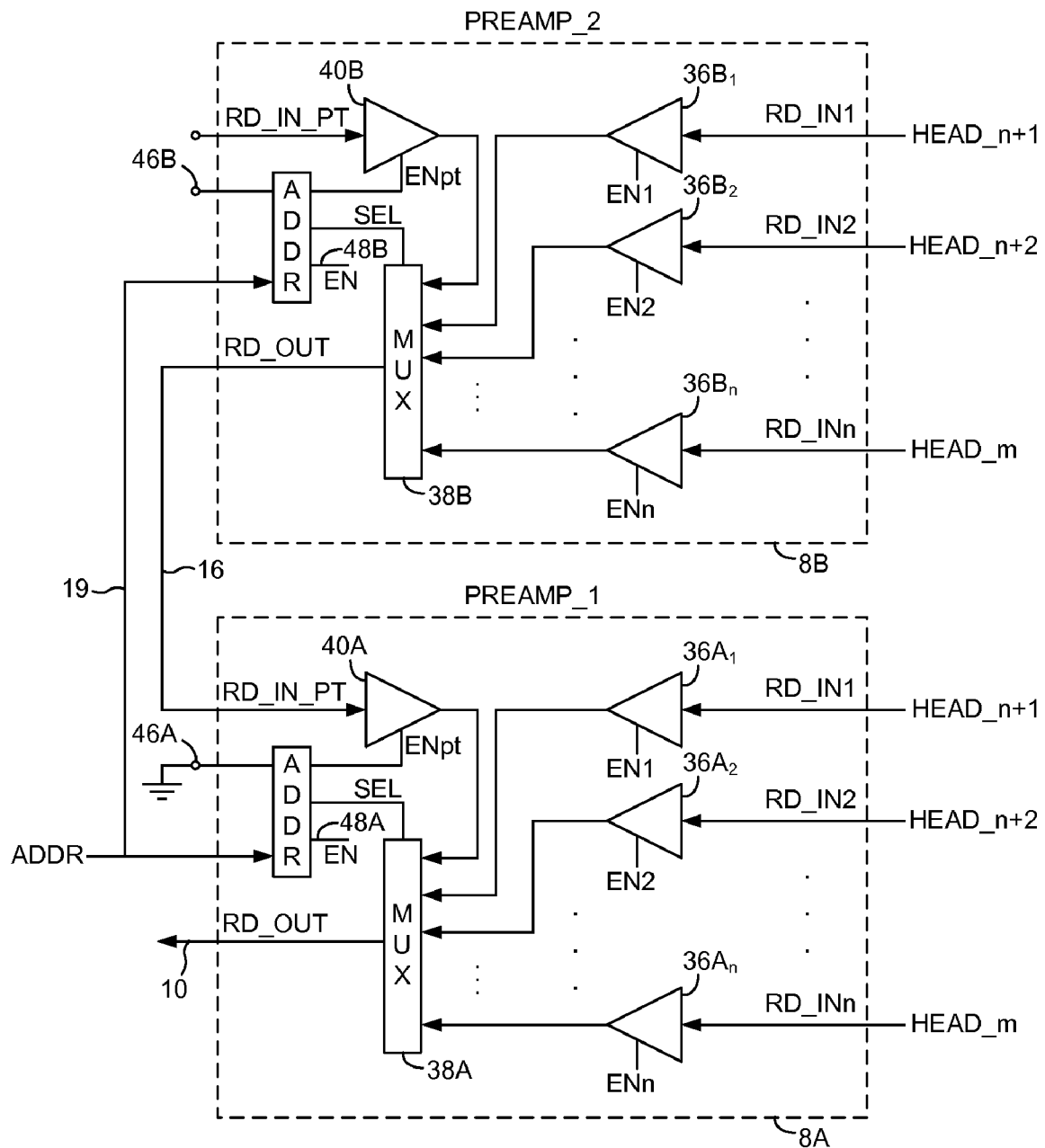

FIG. 3B shows an embodiment of the preamp wherein the read circuitry is substantially the same for both the first and second integrated circuits 8A and 8B. The address circuitry 42A and 42B generates an enable signal 48A and 48B applied to one of the selected amplifiers $36A_1$-$36A_n$ and $36B_1$-$36B_n$, as well as an enable signal applied to the passthrough amplifiers 40A and 40B, and a selection signal for selecting the output of one of the amplifiers $36A_1$-$36A_n$ and $36B_1$-$36B_n$ for the selected head.

Any suitable control circuitry may be employed to implement the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC).

In one embodiment, the control circuitry comprises a microprocessor executing instructions, the instructions being operable to cause the microprocessor to implement the embodiments of the present invention. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a plurality of disk surfaces and a plurality of corresponding heads; and
    a preamp comprising:
        a first integrated circuit coupled to a first plurality of the heads, wherein the first integrated circuit comprising:
            a first read-output for outputting a preamplified read signal;
            a first write-input for receiving a first write signal;
            a write-output-passthrough for outputting a passthrough write signal in response to the first write signal;
            a read-input-passthrough for receiving a passthrough read signal; and
        a second integrated circuit coupled to a second plurality of the heads,
            wherein the second integrated circuit comprising:
            a second read-output for outputting the passthrough read signal;
            a second write-input for receiving the passthrough write signal; and
    control circuitry operable to:
        configure the preamp to select one of the heads during a read operation, and configure the preamp to select one of the heads during a write operation;
        process the preamplified read signal at the read-output of the first integrated circuit during the read operation; and
        apply the first write signal to the write-input of the first integrated circuit during a write operation.

2. The disk drive as recited in claim 1, wherein:
    the control circuitry is operable to generate at least one control signal applied to both the first and second integrated circuits of the preamp; and
    the control signal operable to configure the preamp to select one of the heads during the read and write operation.

3. The disk drive as recited in claim 2, wherein the control signal applied to both the first and second integrated circuits is wire-ORed.

4. The disk drive as recited in claim 1, wherein the first integrated circuit comprises an amplifier for generating the passthrough write signal in response to the first write signal.

5. The disk drive as recited in claim 4, wherein the control circuitry is further operable to enable the amplifier when selecting a head connected to the second integrated circuit during the write operation.

6. The disk drive as recited in claim 1, wherein the first integrated circuit comprises an amplifier for generating the preamplified read signal in response to the passthrough read signal.

7. The disk drive as recited in claim 6, wherein the control circuitry is further operable to enable the amplifier when selecting a head connected to the second integrated circuit during the read operation.

8. The disk drive as recited in claim 1, wherein the first integrated circuit is substantially the same as the second integrated circuit.

9. A preamp for use in a disk drive, the disk drive comprising a plurality of disk surfaces and a plurality of corresponding heads, the preamp comprising:
   a first integrated circuit coupled to a first plurality of the heads, wherein the first integrated circuit comprising:
      a first read-output for outputting a preamplified read signal;
      a first write-input for receiving a first write signal;
      a write-output-passthrough for outputting a passthrough write signal in response to the first write signal;
      a read-input-passthrough for receiving a passthrough read signal; and
   a second integrated circuit coupled to a second plurality of the heads,
      wherein the second integrated circuit comprising:
      a second read-output for outputting the passthrough read signal;
      a second write-input for receiving the passthrough write signal,
wherein the preamp is configurable to select one of the heads during a read operation, and the preamp is configurable to select one of the heads during a write operation.

10. The preamp as recited in claim 9, wherein the first integrated circuit comprises an amplifier for generating the passthrough write signal in response to the first write signal.

11. The preamp as recited in claim 10, wherein the amplifier is enabled when a head connected to the second integrated circuit is selected during the write operation.

12. The preamp as recited in claim 9, wherein the first integrated circuit comprises an amplifier for generating the preamplified read signal in response to the passthrough read signal.

13. The preamp as recited in claim 12, wherein the amplifier is enabled when a head connected to the second integrated circuit is selected during the read operation.

14. The preamp as recited in claim 9, wherein the first integrated circuit is substantially the same as the second integrated circuit.

15. The preamp as recited in claim 14, wherein:
   the first integrated circuit comprises first address circuitry for addressing a first plurality of the heads; and
   the second integrated circuit comprises second address circuitry for addressing a second plurality of the heads.

16. The preamp as recited in claim 15, wherein:
   the first address circuitry is responsive to a first external pin of the first integrated circuit, and
   the second address circuitry is responsive to a second external pin of the second integrated circuit.

17. The preamp as recited in claim 16, wherein at least one of the first and second external pins are grounded.

18. A method of operating disk drive, the disk drive comprising a plurality of disk surfaces and a plurality of corresponding heads, and a preamp comprising:
   a first integrated circuit coupled to a first plurality of the heads, wherein the first integrated circuit comprising:
      a first read-output for outputting a preamplified read signal;
      a first write-input for receiving a first write signal;
      a write-output-passthrough for outputting a passthrough write signal in response to the first write signal;
      a read-input-passthrough for receiving a passthrough read signal; and
   a second integrated circuit coupled to a second plurality of the heads, wherein the second integrated circuit comprising:
      a second read-output for outputting the passthrough read signal;
      a second write-input for receiving the passthrough write signal; and
   the method comprising:
      configuring the preamp to select one of the heads during a read operation, and configure the preamp to select one of the heads during a write operation;
      processing the preamplified read signal at the read-output of the first integrated circuit during the read operation; and
      applying the first write signal to the write-input of the first integrated circuit during a write operation.

19. The method as recited in claim 18, further comprising generating at least one control signal applied to both the first and second integrated circuits of the preamp, wherein the control signal operable to configure the preamp to select one of the heads during the read and write operation.

20. The method as recited in claim 19, wherein the control signal applied to both the first and second integrated circuits is wire-ORed.

21. The method as recited in claim 18, wherein the first integrated circuit comprises an amplifier for generating the passthrough write signal in response to the first write signal.

22. The method as recited in claim 21, further comprising enabling the amplifier when selecting a head connected to the second integrated circuit during the write operation.

23. The method as recited in claim 18, wherein the first integrated circuit comprises an amplifier for generating the preamplified read signal in response to the passthrough read signal.

24. The method as recited in claim 23, further comprising enabling the amplifier when selecting a head connected to the second integrated circuit during the read operation.

25. The method as recited in claim 18, wherein the first integrated circuit is substantially the same as the second integrated circuit.

* * * * *